(12) United States Patent
Moriya

(10) Patent No.: US 6,449,687 B1
(45) Date of Patent: Sep. 10, 2002

(54) COMPUTER READABLE MEDIUM AND INFORMATION PROCESSING APPARATUS

(75) Inventor: Shun Moriya, Tokyo (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/428,464

(22) Filed: Oct. 28, 1999

(30) Foreign Application Priority Data

Oct. 29, 1998 (JP) .......................................... 10-309250

(51) Int. Cl.[7] .............................................. G06F 12/08
(52) U.S. Cl. ........................... 711/112; 711/4; 711/105; 711/111; 711/161; 711/162; 710/52; 710/56
(58) Field of Search ........................ 710/52, 56; 711/4, 711/105, 111, 112, 154, 137, 161, 162

(56) References Cited

U.S. PATENT DOCUMENTS 5,727,232 A * 3/1998 Iida et al. ...................... 710/56
6,018,788 A * 1/2000 Ichikawa ...................... 711/113

FOREIGN PATENT DOCUMENTS

| JP | 3-34158 | 2/1991 |
| JP | 7235141 | 2/1994 |
| JP | 7220399 | 8/1995 |

OTHER PUBLICATIONS

Applicant's Admitted Prior Arts. Specification pp. 1–3; Figure 1. Effective date Oct. 29, 1998.*
An English Language abstract of JP 3–34158, Feb. 14, 1991.
An English Language abstract of JP 7–220399, Aug. 18, 1995.
An English Language abstract of JP 7–235141, Sep. 5, 1995.

* cited by examiner

Primary Examiner—Than Nguyen
(74) Attorney, Agent, or Firm—Greenblum & Bernstein, P.L.C.

(57) ABSTRACT

Disclosed is a computer readable medium capable of functioning an information processing apparatus without making a reading device to operate inefficiently. The recording medium comprises a main program storing area in which a main program for performing a game is recorded and a component recording area in which program components each of which is used for displaying a game character are consecutively recorded. The main program recorded in the main program storing area includes a routine for causing the reading device to read out a plurality of program components that are consecutively stored in the component recording area and for causing a control unit of the apparatus to store some of program components included in the plurality of program components read by the reading device into a memory.

3 Claims, 20 Drawing Sheets

FIG.10A   FIG.10B   FIG.10C
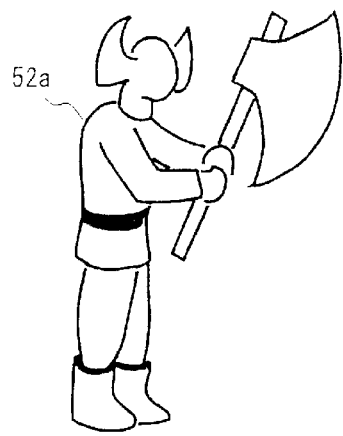
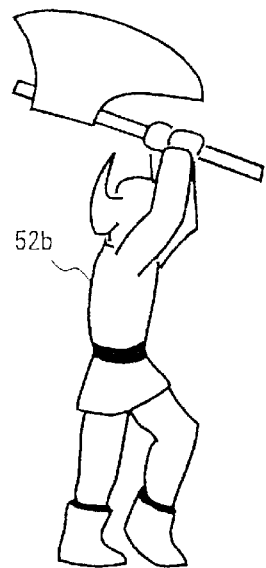
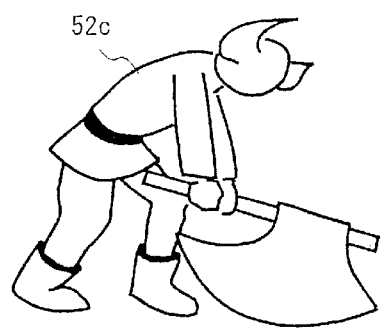
FIG.11
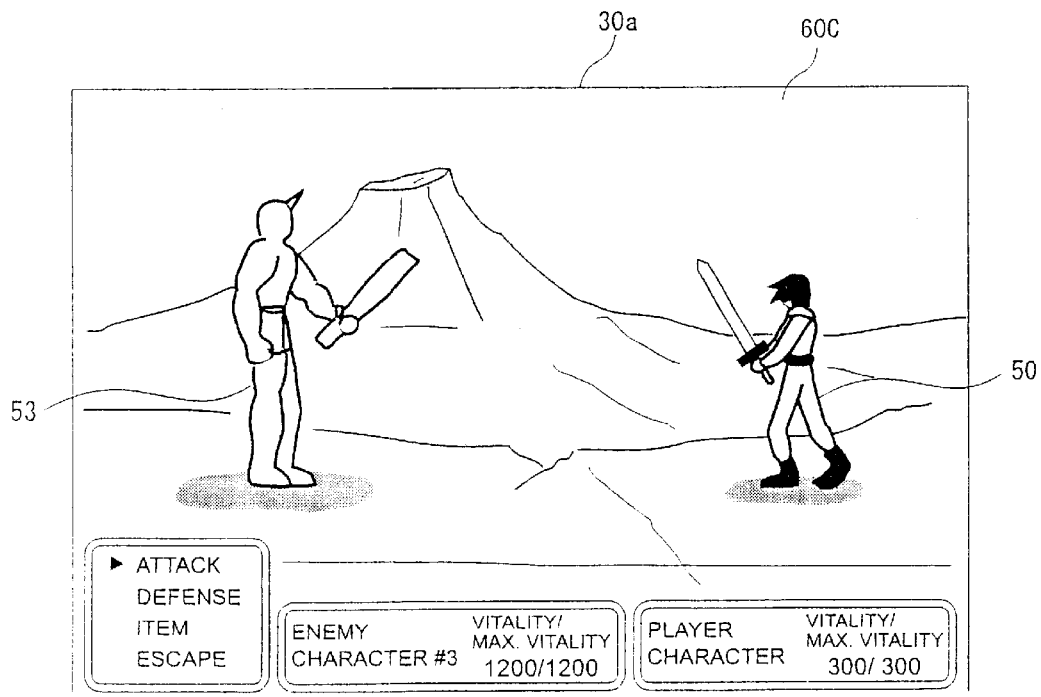

FIG.13A    FIG.13B    FIG.13C
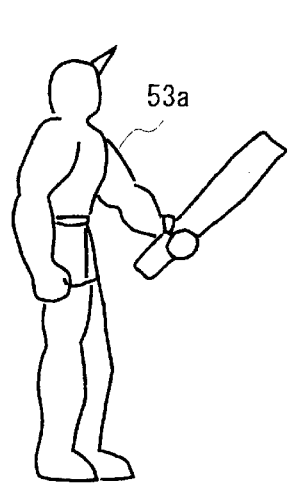
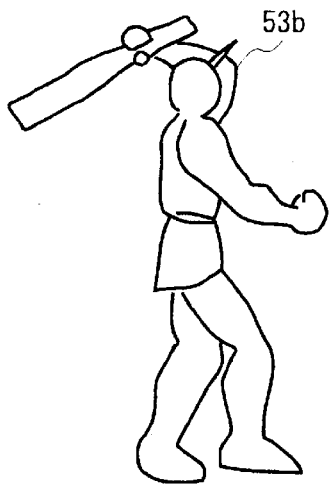
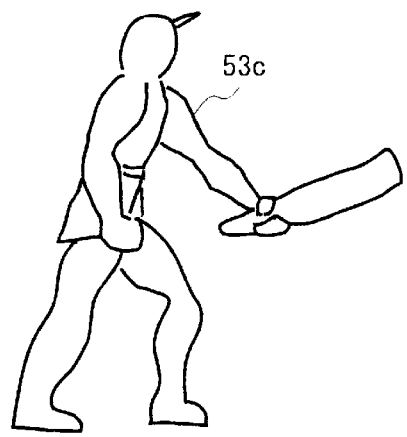
FIG.14
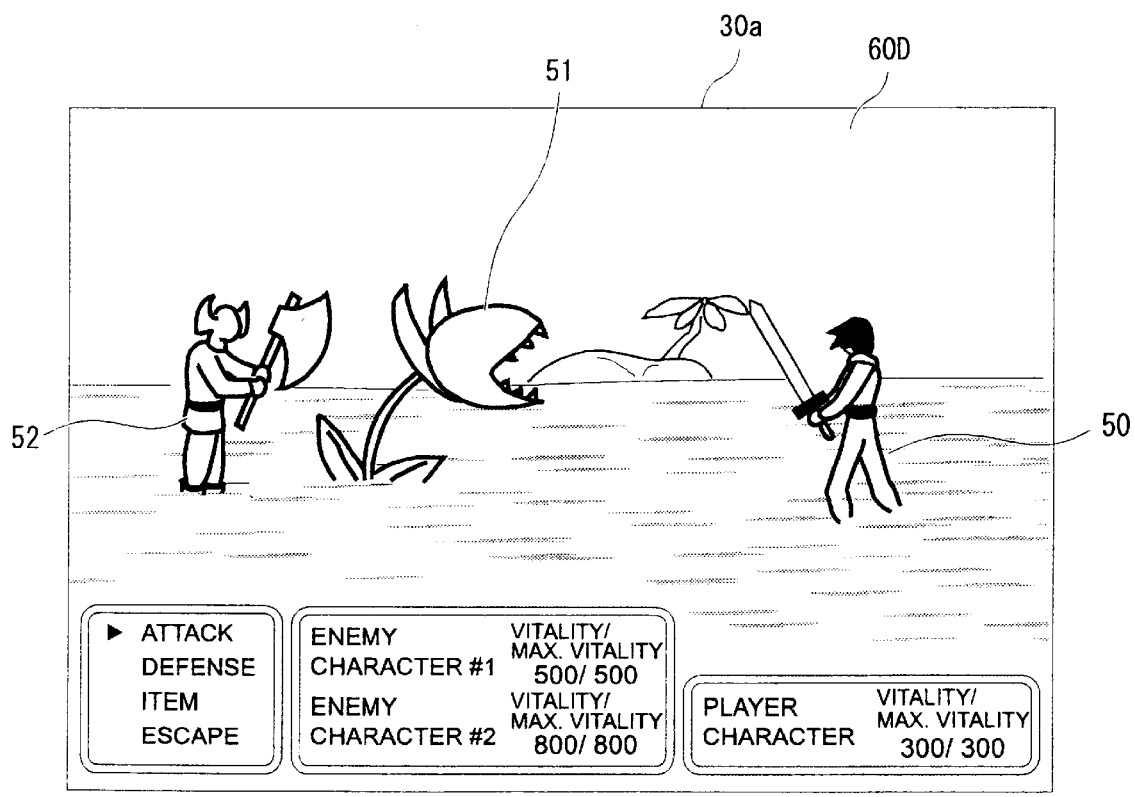

COMPUTER READABLE MEDIUM AND INFORMATION PROCESSING APPARATUS

BACKGROUND OF THE INVENTION

1. Field of the Invention

The present invention relates to a computer readable medium storing a game program and to an information processing apparatus which reads information from a recording medium during an operation thereof.

2. Description of the Related Art

As is well known, a software to operate an information processing apparatus (that is, a computer, a game machine, etc.) is composed of programs and several pieces of data utilized by the programs, and is distributed through a recording medium in a disk shape (for example, a flexible disk, CD-ROM, etc.). At a time of an execution of the software, a part of the software (that is, program or data) in the recording medium is read out and written over useless information on a RAM of the information processing apparatus.

More concretely, a game software for use in an information processing apparatus (a personal computer or a game machine) is distributed through a CD-ROM 100 having a configuration as shown in FIG. 1, for example. That is, the CD-ROM 100 is generally pressed such that a game program including a main program and a plurality of program codes is recorded in a recording area 100c at an inner radius side on the disk plane thereof, a group of animation data is recorded in a recording area 100a at its outer radius side, and a group of graphic data is recorded in a recording area 100b therebetween. In other words, a recording area composed of contiguous storage locations (sectors) that exist near the center of the CD-ROM 100 is used for storing the game program, and a recording area composed of contiguous storage locations that exist near the outer edge of the CD-ROM 100 is used for storing the animation data. Furthermore, the program codes, the animation data, the graphic data and the likes are recorded in the CD-ROM 100 in a form where each information can be identified by a file name.

The CPU in the information processing apparatus having a CD-ROM drive that is set with the CD-ROM 100 will operate as follows. At first, the CPU read out the main program within the recording area 100c onto the RAM by controlling the CD-ROM drive. Thereafter, the CPU, in accordance with the main program in the RAM, reads out several units of information (usually, several program codes and several graphic data) from the CD-ROM 100 to the RAM. Then, the CPU begins a control using the information prepared on the RAM, and if a predetermined condition (for example, a condition for proceeding to a new stage) is fulfilled, it reads several information corresponding to the fulfilled condition, from the CD-ROM 100, and stores them on the RAM to overwrite useless information. Then, it begins a control that utilizes this newly prepared information.

Thus, in the information processing apparatus that is set with the CD-ROM 100, processing to read out several pieces of information necessary for continuing the execution of program from the CD-ROM 100 and stored on the RAM is executed. The configuration of the CD-ROM 100 described above causes the CD-ROM drive to operate inefficiently at a time of this processing (hereinafter, it refers to as an update processing)

That is, at a time of the update processing, usually, several graphic data and several program codes are read out from the CD-ROM 100. But, in the CD-ROM 100, these information are recorded in the recording areas that are separated each other. As a result, there are many occasions that the head of the CD-ROM drive is not located in a neighborhood of the recording area of the information in the CD-ROM 100 at the time when a read instruction for a certain information is issued to the CD-ROM drive during the update processing, which causes that a relatively long latency time is included in a response time (an access time) for each of the reading instructions.

Further, in general information processing apparatus, two seek actions must be performed in the CD-ROM drive to read out two files consecutively recorded on the CD-ROM 100. More specifically, the CD-ROM 100 causes the CD-ROM drive to operate inefficiently at a time of the updating processing, because information are recorded in the recording areas that are separated each other, and each information is recorded as a file.

SUMMARY OF THE INVENTION

It is an object of the present invention to provide a computer readable medium capable of operating an information processing apparatus without making a reading device of the apparatus perform a useless operation.

It is another object of the present invention to provide an information processing apparatus operates at high speed.

In order to achieve the above mentioned object, a computer readable medium which is readable by a computer having a memory through a reading device according to the present invention comprises a program recording area in which a main program to be executed by the computer to perform a game is recorded and a component recording area in which program components each of which is used by the computer executing the main program to display a game character are consecutively recorded. The main program recorded in the program recording area includes a routine for causing the reading device to read out a plurality of program components that are consecutively stored in the component recording area and for storing a some of the program components outputted by the reading device into a memory.

The computer readable medium according to the present invention is so configured as to have the program recording area in which a main program is recorded and the component recording area in which program components each of which is used by the computer to display a game character are consecutively recorded. The main program which is recorded in the computer readable medium is executed by the computer to make the reading device, at a time when some of the program components is required, read out the program components that are consecutively recorded in the component recording area including said some of the program components and to make the computer write said some of the program components into the memory.

By setting this recording medium to the reading device of the information processing apparatus such as a computer or a game machine, a reading of the necessary program components will be completed without causing the reading device to perform a useless operation. Accordingly, using the recording medium of the present invention, the information processing apparatus can be functioned in a state that a latency time is less, in other words, the information processing apparatus can be functioned much faster than the conventional ones.

An information processing apparatus of the invention comprises a recording medium in which program components each of which is used for displaying a game character are recorded, a reading device for reading the program components from the recording medium, a memory for temporally storing some of the program components recorded in the recording medium and control means for controlling the reading device to read out a plurality of program components that are consecutively stored in the recording medium and for storing some of the program components read by the reading device into the memory.

The information processing apparatus of the present invention is configured as to operate similarly to a computer set with the computer readable medium of the present invention. Accordingly, the information processing apparatus functions much faster than the conventional ones.

Note that, in actualizing this information processing apparatus, it is not necessary to record a main program on the recording medium in which program components are recorded. Further, as the recording medium, every type of medium can be used, for example, a compact disc.

BRIEF DESCRIPTION OF THE DRAWINGS

Further objects and advantages of the invention can be more fully understood from the following detailed description taken in conjunction with the accompanying drawings in which:

FIGS. 10A, 10B and 10C are diagrams used for explanation of a program code and a graphic code displaying an enemy characters #2;

FIG. 11 is a diagram showing one example of image displayed on the display screen by the information processing apparatus;

FIGS. 13A, 13B and 13C are diagrams used for explanation of a program code and a graphic code used for displaying enemy character #3;

FIG. 14 is a diagram showing one example of image displayed on a display screen by the information processing apparatus;

DESCRIPTION OF THE PREFERRED EMBODIMENTS

The embodiments of the present invention will be described more concretely with reference to the accompanying drawings.

Figure 2:
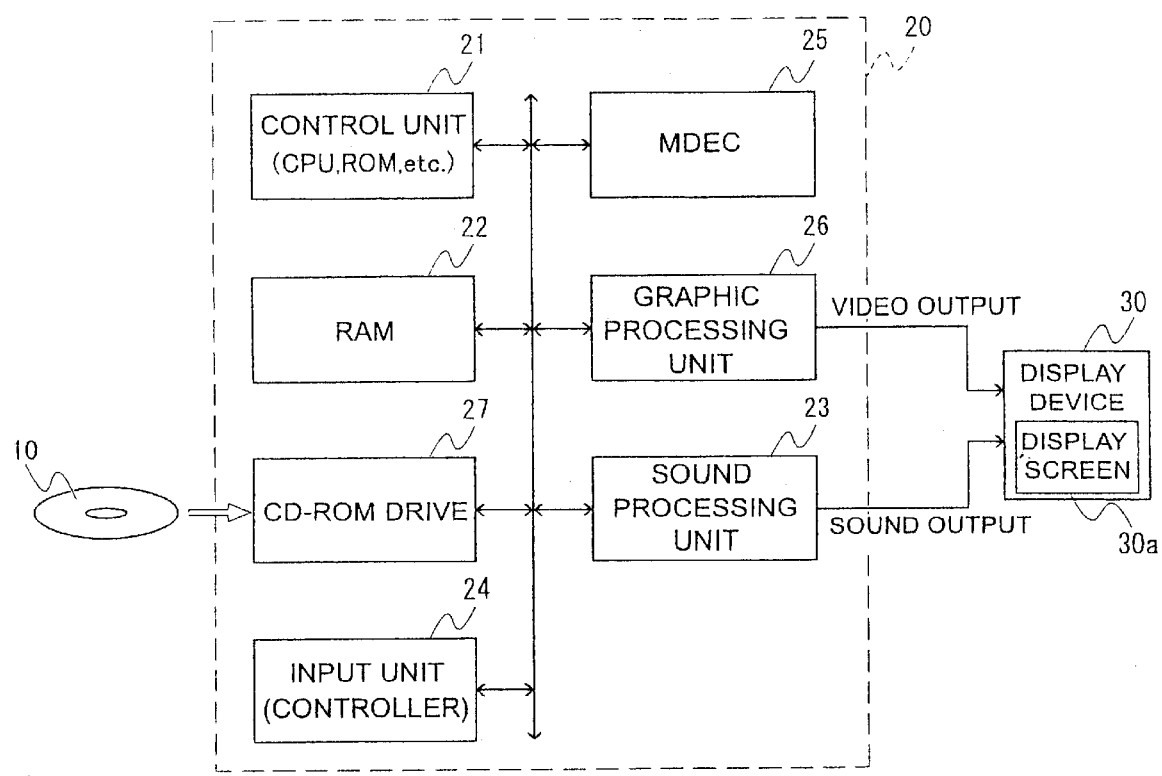
FIG. 2 is a block diagram showing a schematic configuration of an information processing apparatus according to one embodiment of the present invention.

At first, with reference to FIG. 2, a hardware configuration of an information processing apparatus according to one embodiment of the present invention will be described.

As shown in the figure, the information processing apparatus 20 according to the present embodiment includes, for example, a control unit 21, a RAM 22, a sound processing unit 23, an input unit 24, an MDEC 25, a graphic processing unit 26 and a CD-ROM drive 27, as the main components thereof. This information processing apparatus 20 is used in a state where it is connected to a display device 30 (so-called home television set) that includes a display screen 30a and a speaker, through the graphic processing unit 26 and the sound processing unit 23.

The control unit 21 is composed of a CPU, a ROM and the likes. The control unit 21 (CPU) integratedly controls the respective units within the information processing apparatus 20 in accordance with the program stored in the RAM 22 (or ROM as the case may be). The CD-ROM drive 27 is a reading device for a CD-ROM 10 in which a software (that is, game program) that defines the operation procedures of the control unit 21 is recorded. The CD-ROM drive 27 read out data recorded in the outer radius side of the DC-ROM 10 at faster speed than the inner radius side.

The sound processing unit 23 creates and outputs a sound signal to generate a voice, a music, a sound effect and the likes from the speaker built in the display device 30. The sound processing unit 23 creates and outputs a sound signal, based on the data that is read out from the CD-ROM 10 and stored into the RAM 22 under the control of the control unit 21. The input unit 24 is an interface through which a user inputs information to the information processing apparatus 20. The respective units other than the input unit 24 in the information processing apparatus 20 are accommodated in a body, and the input unit 24 is accommodated in another device which is called controller and which is to be connected to the body through a cable. The information processing apparatus 20 may be the one of which input unit 24 and other units are accommodated in one body.

The MDEC 25 is a circuit that is capable of executing an inverse DCT (discrete cosine transformation) operation at fast speed. The MDEC 25 is used for expanding compressed data (that is, the image data and the animation data that are compressed/recorded in the CD-ROM 10) in a format such as the JPEG (Joint Photographic Experts Group) or the MPEG (Moving Picture Expert Group). The graphic processing unit 26 contains a frame buffer, which draws an image (a polygon) corresponding to an instruction supplied from the control unit 21 on the frame buffer, and concurrently creates and outputs a video signal corresponding to the image drawn on the frame buffer. The graphic processing unit 26 also performs a processing to output a video signal based on the expansion result by the MDEC 25.

In the following, an operation of the information processing apparatus 20, and a configuration of the CD-ROM 10 will be described in detail.

Figure 3:
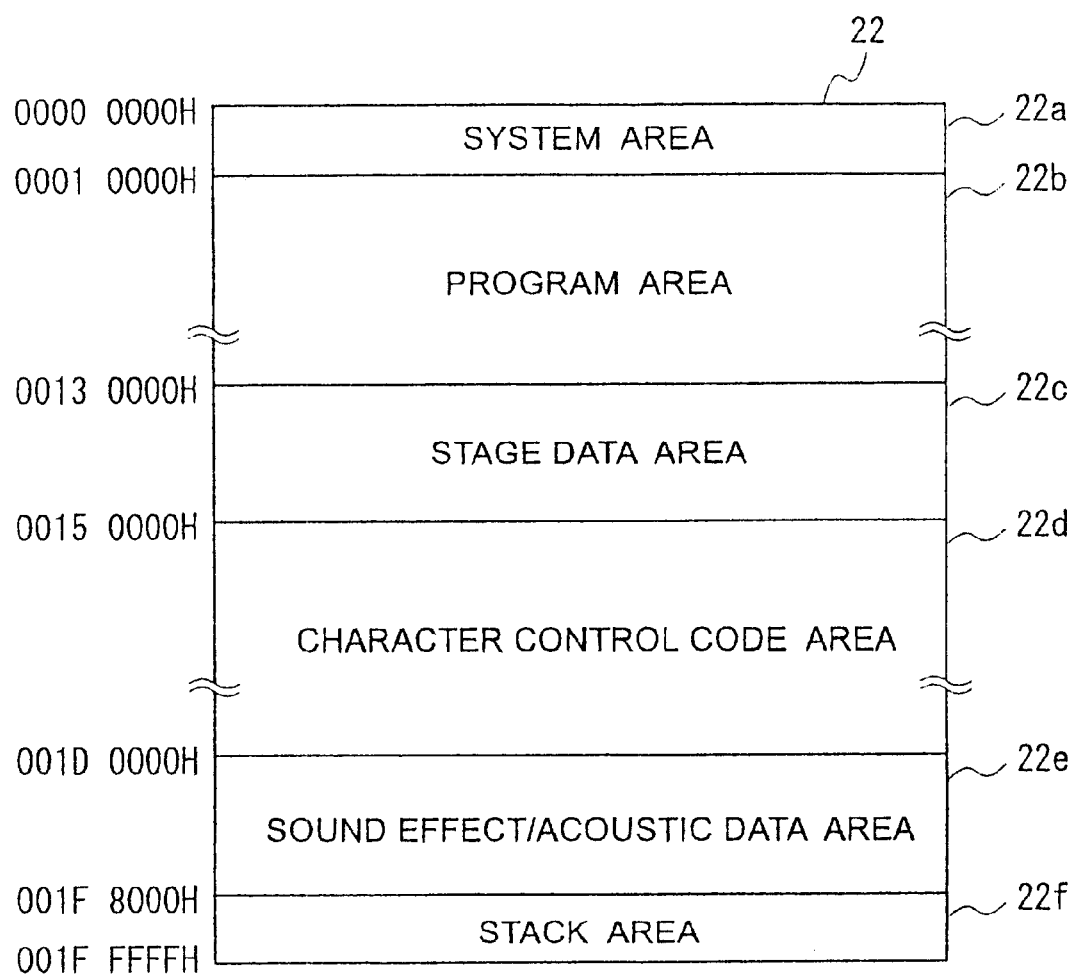
FIG. 3 is an illustrative diagram showing a usage configuration of a RAM in the information processing apparatus.

At first, with reference to FIG. 3, a usage configuration of the RAM 22 will be discussed. As shown in the figure, the storage area of the RAM 22 is separated into a system area 22a, a program area 22b, a stage data area 22c, a character control code area, a sound effect/audio data area 22e and a stack area 22f.

The system area 22a is an area in which an OS (operating system) of the information processing apparatus 20 is allocated. The system stack area 22f is a work area of the OS. The program area 22b is an area to which a main program recorded in the CD-ROM 10 is read in. Further, in this area, a code table (described in detail below) that is referred to at a time when the various types of codes contained in the CD-ROM 10 is read is also stored.

The stage data area 22c is an area into which a graphic data used for displaying a background image of a stage the video game is stored. The character control code area 22d is an area into which information required for displaying game characters is stored. In this area, for every character that will appear on a stage in the video game, a graphic code defining a basic shape thereof and a program code for displaying the game character in the various attitudes, based on the graphic code are stored. More specifically, in the character control code area 22d, several pairs of the graphic codes and the program codes (hereinafter, a pair of the program code and the graphic code is referred to as a program component) required for displaying the game characters are stored. The sound effect/audio data area 22e is an area into which data to be reproduced as a voice, a music, a sound effect and the like are stored.

Reading out the graphic data, the program components and the likes from the CD-ROM 10 to the RAM 22 is performed at each time when the video game on a new stage is started.

Figure 4:
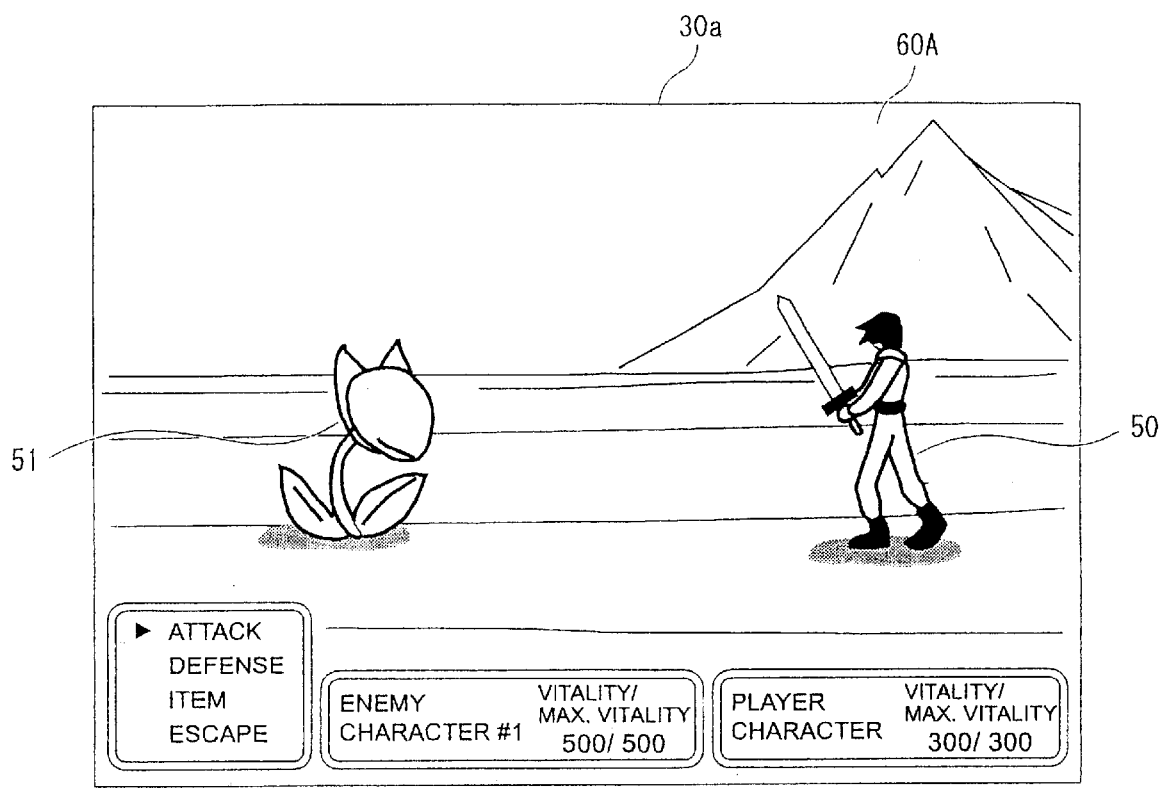
FIG. 4 is a diagram showing one example of image displayed on a display screen by the information processing apparatus.

As shown in FIG. 4, in a stage, a player character 50, enemy character 51 (the enemy character #1) and a background image 60A are displayed on the display screen 30a.

Figure 5:
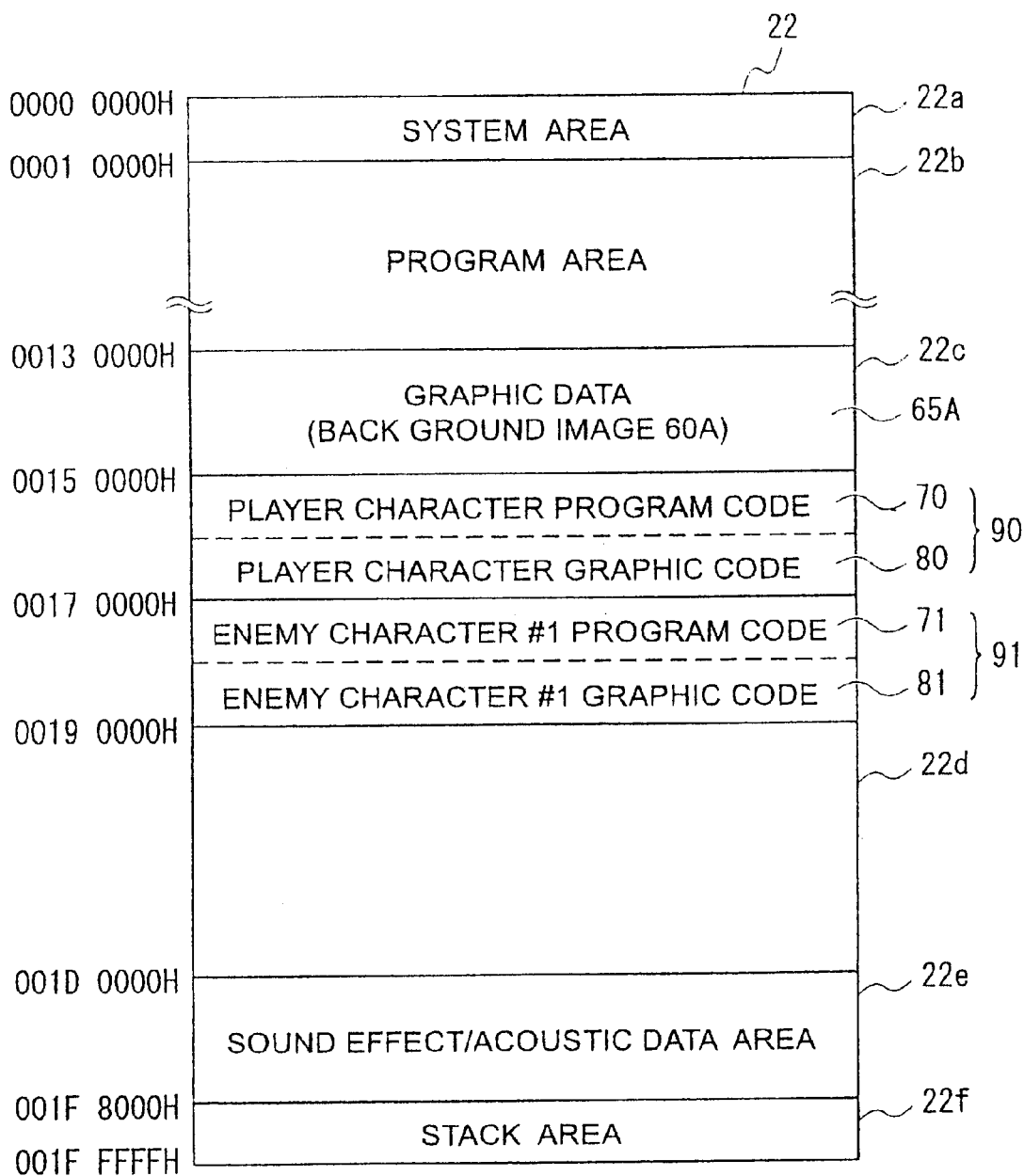
FIG. 5 is an illustrative diagram showing a usage status of the RAM at a time of displaying the image shown in FIG. 3.
Figure 6A:
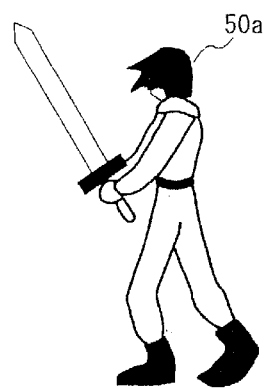
FIGS. 6A, 6B and 6C are diagrams used for explanation of a program code and a graphic code displaying a player characters.
Figure 6B:
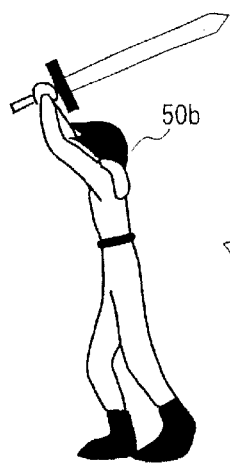
Figure 6C:
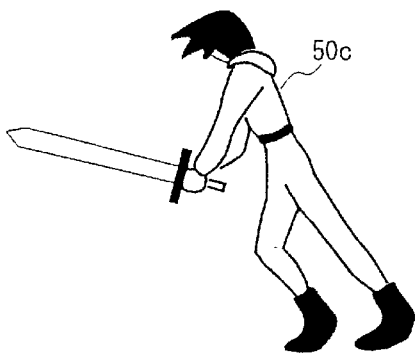
Figure 7A:
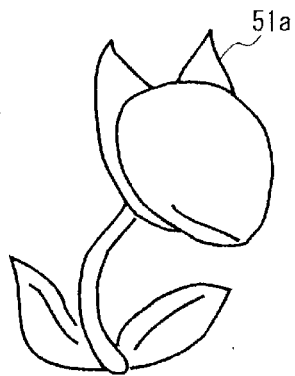
FIGS. 7A, 7B and 7C are diagrams for illustrating a program code and a graphic code used for displaying an enemy characters #1.
Figure 7B:
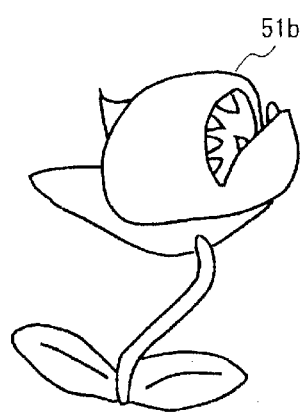
Figure 7C:
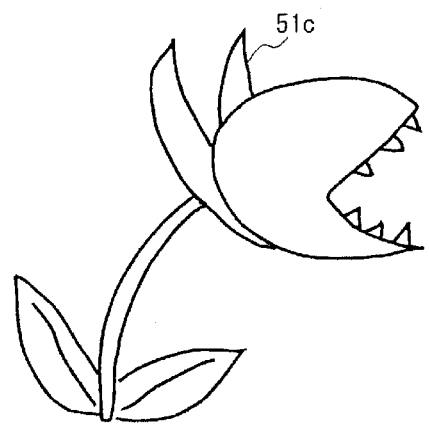

At a time the video game on this stage is started, the content of the RAM 22 is updated to the one shown in FIG. 5. More specifically, a graphic data 65A for the background image 60A recorded in the CD-ROM 10 is read out and stored into the stage data area 22c within the RAM 22. Further, a program component 90 (which is a combination of a program code 70 and a graphic code 80) for displaying the player character in various attitudes, for example, as the ones 50a, 50b and 50c shown in FIGS. 6A, 6B and 6C is read out from the CD-ROM land stored into the character control code area 22d. A program component 91 (which is a combination of a program code 71 and a graphic code 81) for displaying the enemy character #1 in various attitudes, for example, as the ones 51a, 51b and 51c shown in FIGS. 7A, 7B and 7C is also read out from the CD-ROM 10 and stored into the character control code area 22d.

Figure 8:
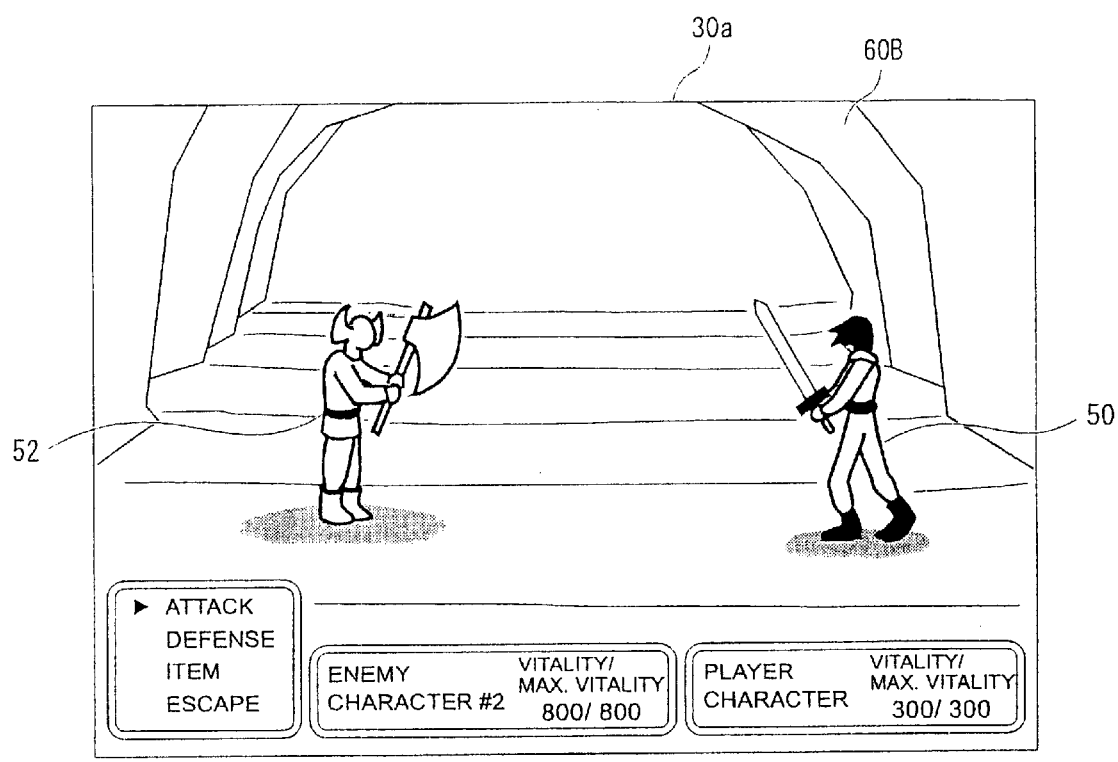
FIG. 8 is a diagram showing one example of image displayed on the display screen by the information processing apparatus.

In another stage, the player character 50, an enemy character 52 (an enemy character #2) and a background image 60B are displayed on the display screen 30a as shown in FIG. 8. At a time the video game on this stage is started, the content of the RAM 22 is updated to the one shown in FIG. 9. More specifically, a graphic data 65B for the background image 60B is read in to the stage data area 22c. Further, the program component 90 (which is a combination of the program code 70 and the graphic code 80) for the player character 50 and a program component 92 (which is a combination of a program code 72 and a graphic code 82) for displaying the enemy character #2 in various attitudes, for example, as the ones 52a, 52b and 52c shown in FIGS. 10A, 10B and 10C is read in to the character control code area 22d.

In another stage, the player character 50, an enemy character 53 (an enemy character #3) and a background image 60C are displayed on the display screen 30a as shown in FIG. 11. At a time the video game on this stage is started, the content of the RAM 22 is updated to the one shown in FIG. 12. More specifically, a graphic data 65C for the background image 60C is read in to the stage data area 22c. Further, the program component 90 for the player character 50 and a program component 93 (which is a combination of a program code 63 and a graphic code 73) for displaying the enemy character #3 in various attitudes, for example as the ones 53a, 53b and 53c shown in FIGS. 13A, 13B and 13C are read in to the character control code area 22d.

In another stage, the player character 50, the enemy characters 51, 52 (the enemy characters #1, #2) and a background image 60D are displayed on the display screen 30a as shown in FIG. 14. At a time when the video game on this stage is started, the content of the RAM 22 is updated to the one shown in FIG. 15. More specifically, a graphic data 65D for the background image 60D is read in to the stage data area 22c. Further, the program component 90 for the player character 50, the program component 91 for the enemy character 51 and the program component 92 for the enemy character 52 are read in to the character control code area 22d.

Figure 16:
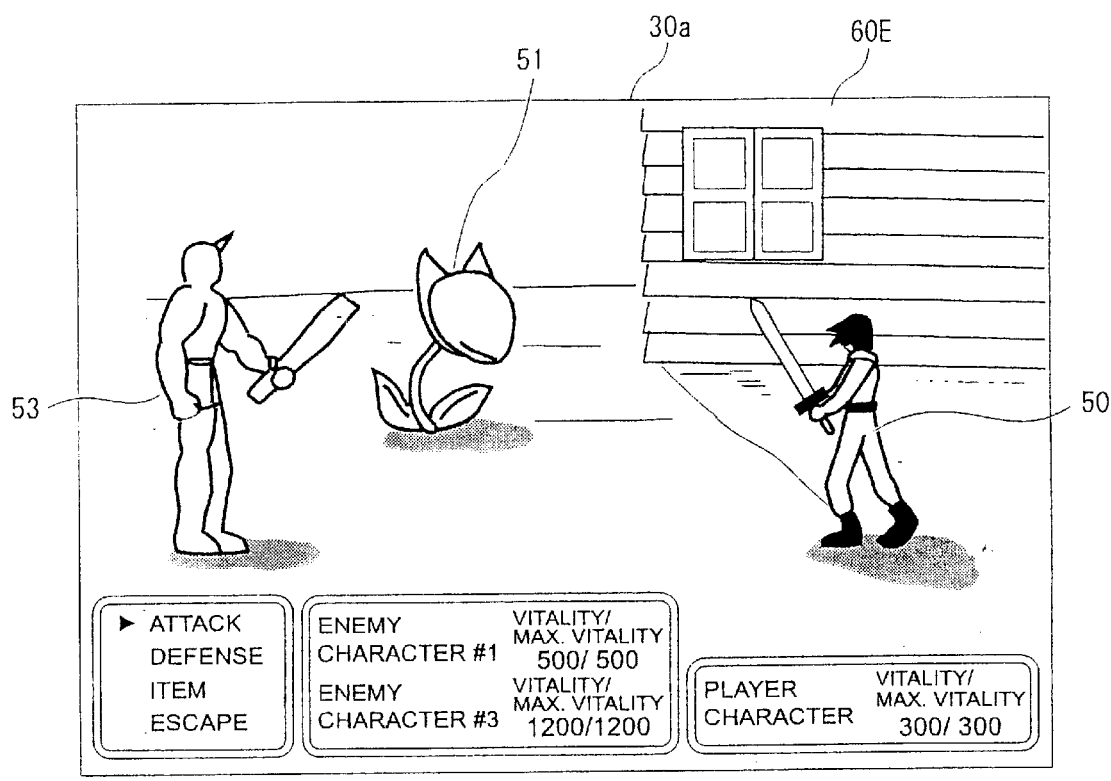
FIG. 16 is a diagram showing one example of image displayed on a display screen by the information processing apparatus.

In another stage, the player character 50, the enemy characters 51, 53 (the enemy characters #1, #3) and a background image 60E are displayed on the display screen 30a as shown in FIG. 16. At a time when the video game on this stage is started, the content of the RAM 22 is updated to the one shown in FIG. 17. More specifically, a graphic data 65E for the background image 60E is read in to the stage data area 22c. Further, the program component 90 for the player character 50, the program component 91 for the enemy character #1 and the program component 93 for the enemy character #2 are read in to the character control code area 22d.

Figure 18:
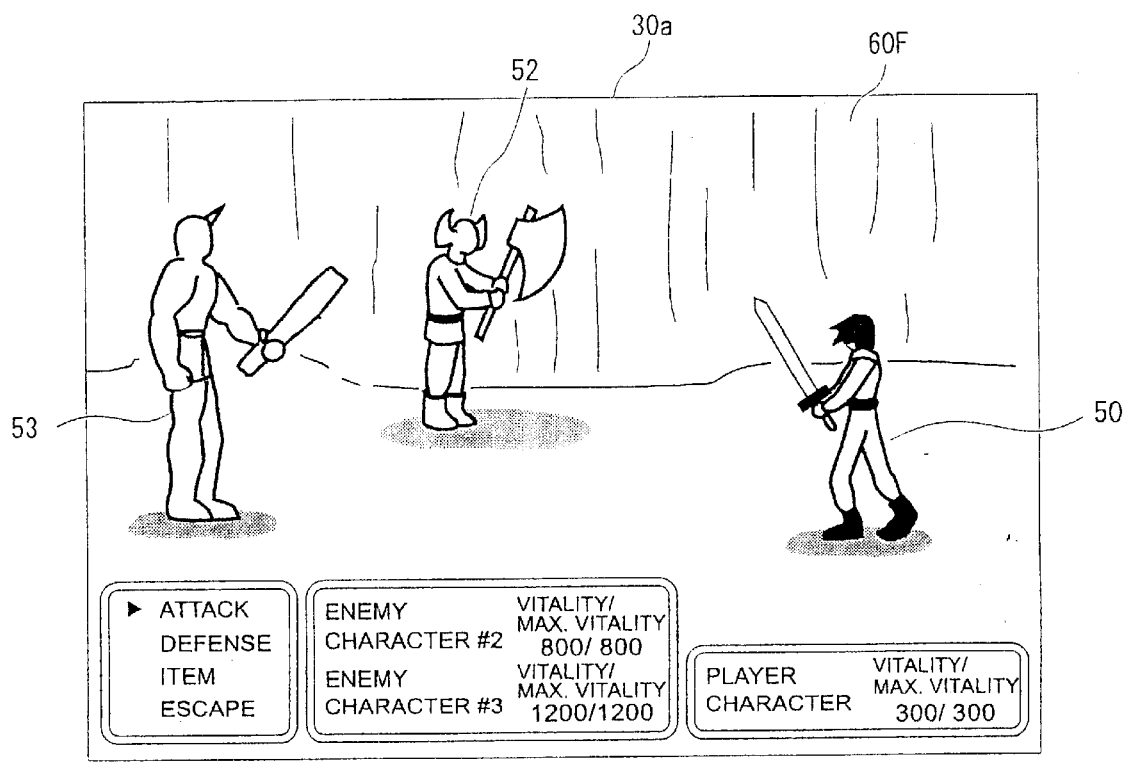
FIG. 18 is a diagram showing one example of image displayed on a display screen by the information processing apparatus.

In another stage, the player character 50, the enemy characters 52, 53 and a background image 60F are displayed on the display screen 30a as shown in FIG. 18. At a time when the video game on this stage is started, the content of the RAM 22 is updated to the one shown in FIG. 19. More specifically, a graphic data 65F for the background image 60F is read in to the stage data area 22c. Further, the program component 90 for the player character 50, the program component 92 for the enemy character #2 and the program component 93 for the enemy character #3 are read in to the character control code area 22d.

Figure 20:
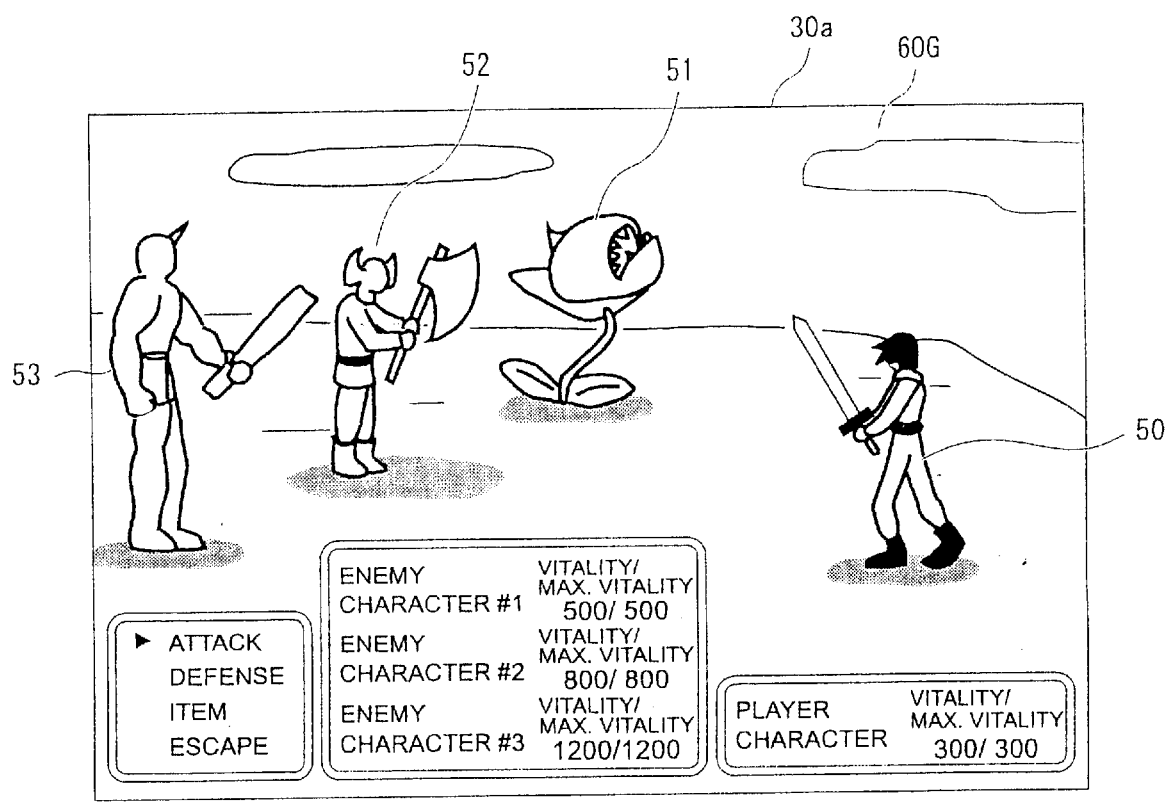
FIG. 20 is a diagram showing one example of image displayed on a display screen by the information processing apparatus.

In another stage, as shown in FIG. 20, the player character 50, the enemy characters 51 through 53 and a background image 60G are displayed on the display screen 30a. At a time when the video game on this stage is started, the content of the RAM 22 is updated to the one shown in FIG. 21. More specifically, a graphic data 65G for the background image 60G is read in to the stage data area 22c. Further, the program component 90 for the player character 50, the program component 91 for the enemy character #1, the program component 92 for the enemy character #2 and the program component 93 for the enemy character #3 are read in to the character control code area 22d.

Figure 1:
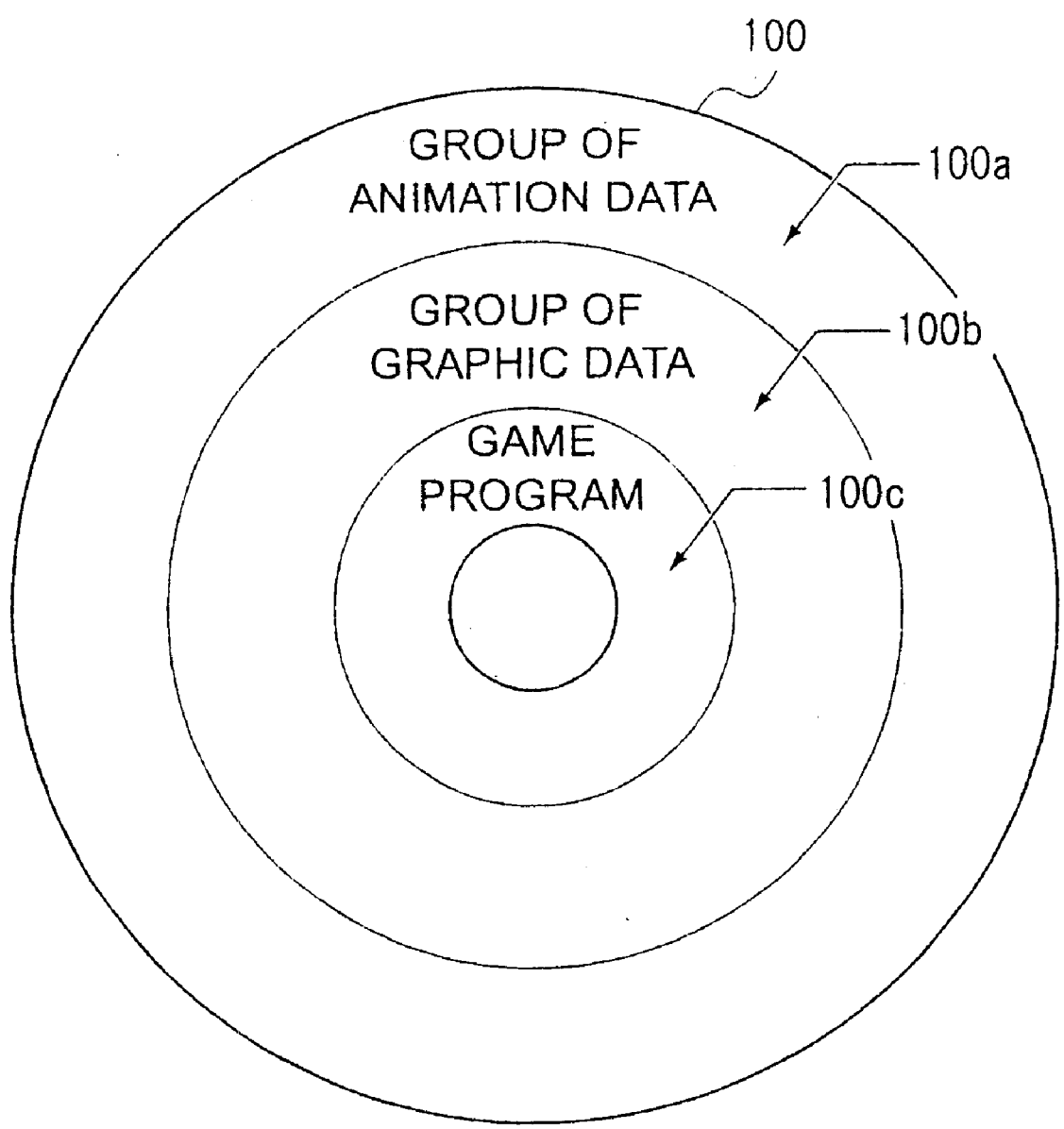
FIG. 1 is an illustrative diagram showing a configuration of a general CD-ROM.
Figure 22:
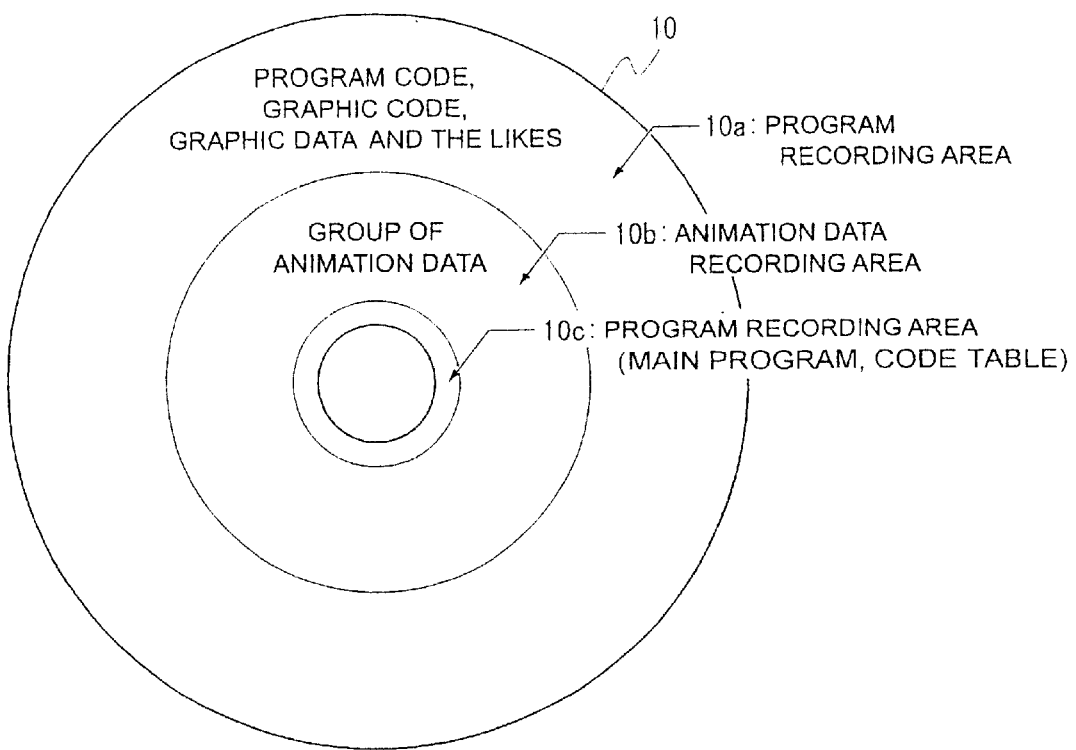
FIG. 22 is an illustrative diagram showing a configuration of a CD-ROM according to the embodiment.
Figure 23:
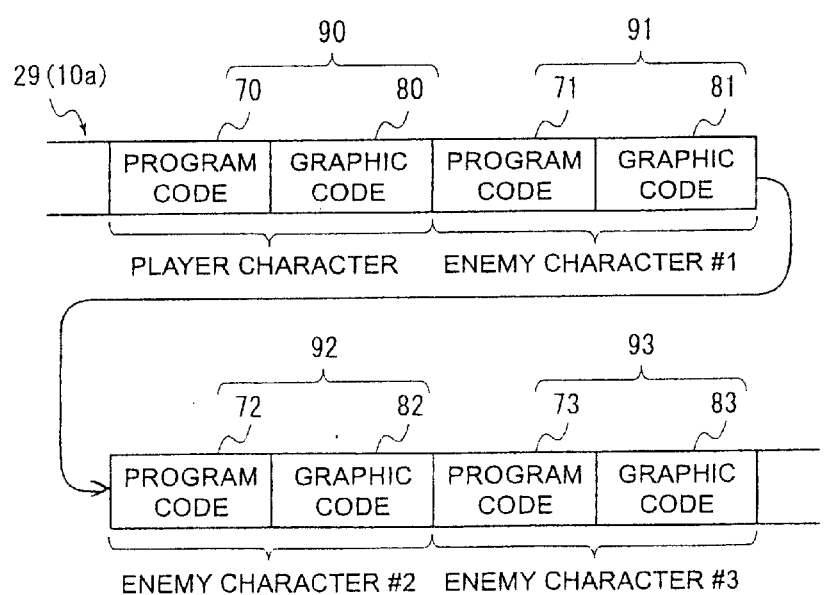
FIG. 23 is an illustrative diagram showing a usage status of the program recording area at the outer radius side in the CD-ROM.

On the CD-ROM 10, these pieces of information (graphic data, program codes, graphic codes, etc.) which are to be read out and stored in to the RAM 22 under the control of the main program are recorded in the configurations as shown in FIGS. 22, 23. More specifically, the entire recording area on the CD-ROM 10 is divided into two program recording areas 10a, 10c and one animation data recording area 10b as shown in FIG. 22. The animation data recording area 10b is equivalent to the recording area 100a in the CD-ROM 100 shown in FIG. 1. Animation data recording area 10b is stored with movie data in the JPEG format or the MPEG format used at a time when the video game starts, and several movie data each used at a time when a specific event is occurred during an execution of a game, and the likes.

Whole of the program recording areas 10a, 10c is equivalent to whole of the recording area 100b and the recording area 100c in the CD-ROM 100. In the program recording area 10c at the inner radius side on the CD-ROM 10, the main program and the code table are recorded. In the program recording area 10a at the outer radius side, the various kinds of information (that is, the graphic data for the background image, the program components, and the likes) that are to be read in to the RAM 22 under the control of the main program are recorded.

In the program recording area 10a, the plural program components are recorded consecutively. In this area where the program components are recorded (hereinafter, referred as to the component recording area), the program components regarding the characters that may be displayed simultaneously are recorded in the proximity recording locations. For example, the above described player character 50 and the enemy characters 51 through 53 (the enemy characters #1 through #3) may be displayed simultaneously. Accordingly, the program components regarding these characters are, as schematically shown in FIG. 23, contiguonsly recorded in the component recording area 29 within the program recording area 10a.

Further, the CD-ROM 10 contains the above mentioned various kinds of information (the program, data, codes) as one file. Therefore, the code table read out from the CD-ROM 10 and written into RAM 22 is used for reading out the respective information from the CD-ROM 10.

Figure 24:
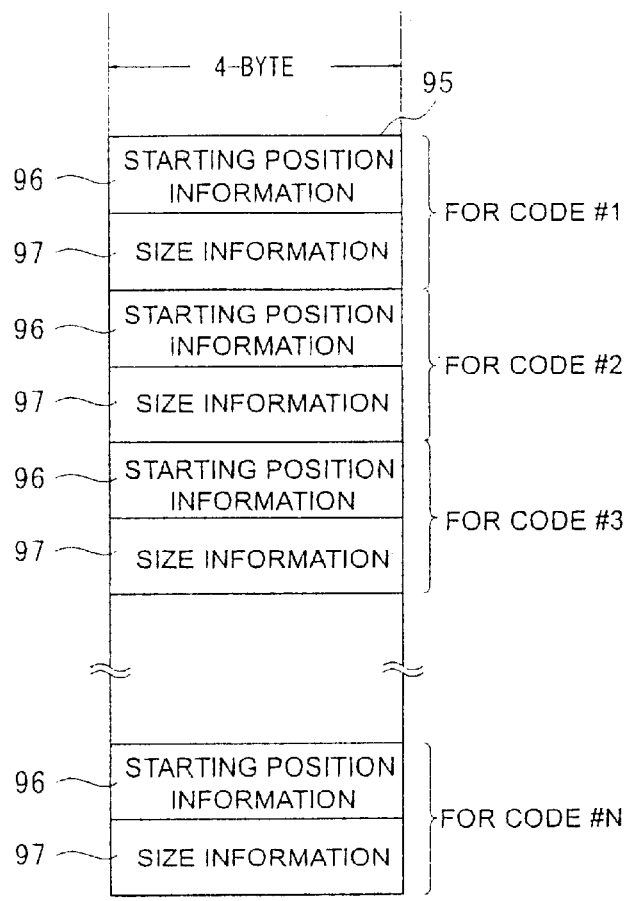
FIG. 24 is an illustrative diagram showing the code table that is referred to at a time when reading the data, the codes from the CD-ROM.

Concretely, as schematically shown in FIG. 24, the code table 95 holds starting position information 96 of 4 bytes and size information 97 of 4 bytes for each of codes #1 to #N. Here, N is a positive integer, and code #X (X is a integer, where 1≦X≦N) is a bulk of information, that is, the program component, the graphic data and the likes, which may be read singly. The starting position information 92 for the code #X indicates a starting position of the recording area where the code #X is recorded, and the size information 94 of the code #X indicates the size of the code #X.

The main program contains instructions for reading out codes from the CD-ROM 10, each of which includes the code number X corresponding to the code #X. More specifically, the main program causes, at a time when a code of the code number X is to be read out from the CD-ROM 10 into RAM 22, the control unit 21 to obtain the starting position information 92 and the size information 94 corresponding to the code number X from the code table 90, and to read out the information which is recorded within an area from the position (sector) that is defined by the obtained starting position information 92, of which size is defined by the obtained size information 94, on the CD-ROM 10.

Furthermore, the main program read into the program area 22a includes routines which cause the control unit 21 to operate as follows.

Figure 9:
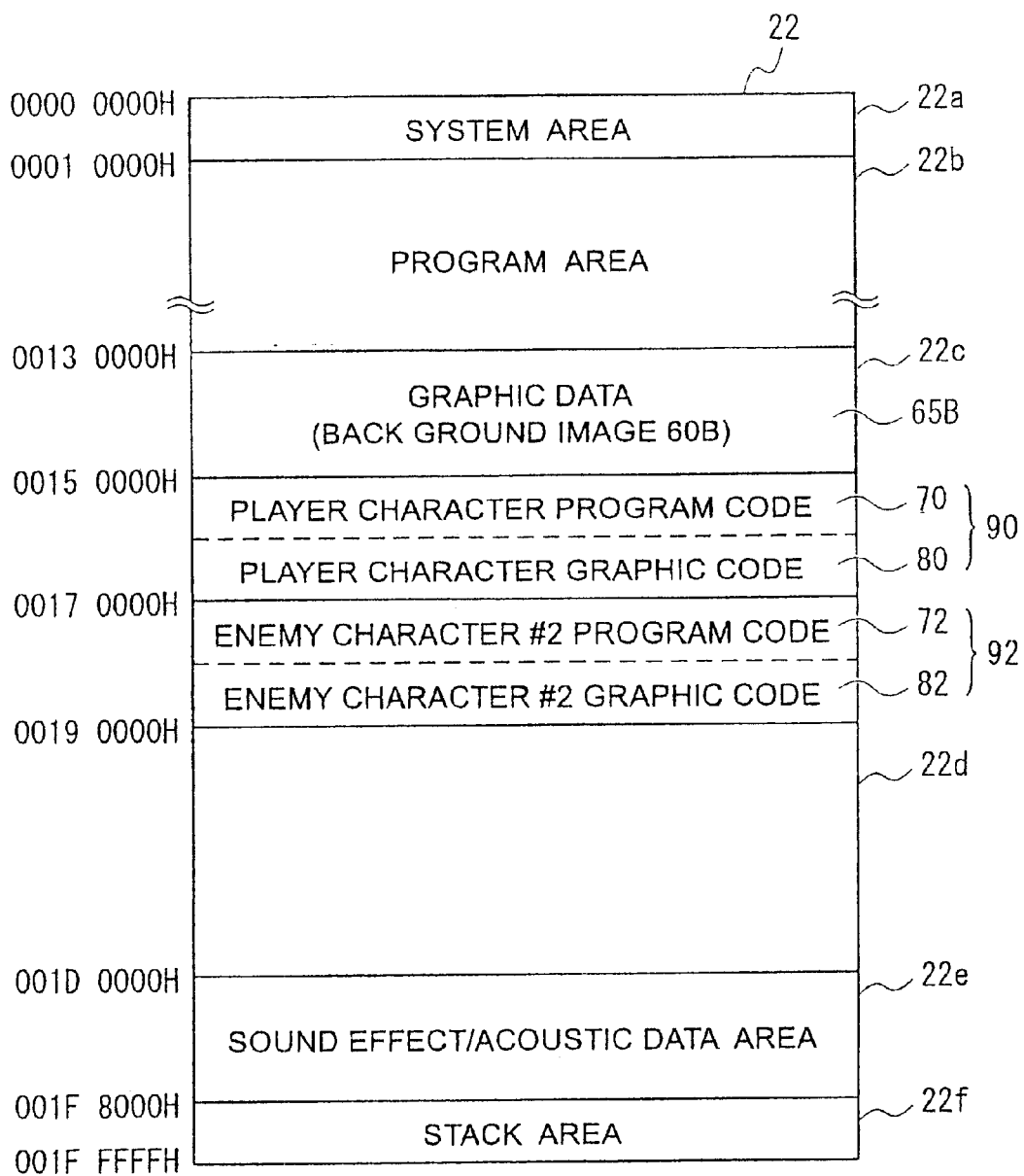
FIG. 9 is an illustrative diagram showing a usage status of the RAM at a time of displaying the image shown in FIG. 8.
Figure 25:
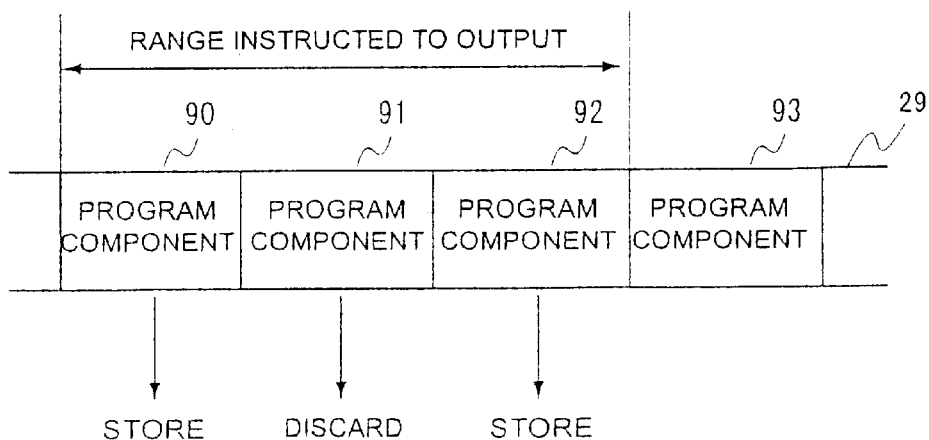
FIG. 25 is an illustrative diagram showing a procedure for reading the program components from the CD-ROM executed in the information processing apparatus.

When updating the content of the RAM 22 in to the one shown in FIG. 9, namely, when the program component 90 and 92 are to be stored in the RAM 22, the control unit 21 first instructs the CD-ROM drive 27 to output data stored in a series of contiguous storage locations which begins at the storage location of the program code 90 for the player character 50 and ends at the storage location of the graphic code 92 for the enemy character #2 (see FIG. 23). More Specifically, as schematically shown in FIG. 25, the control unit 21 instructs the CD-ROM drive 27 to output the program components 90, 91, and 92 by issuing a instruction including a start address of the program component 90 and the size information indicating the total size of these three program components 90, 91 and 92.

Then, the control unit 21 stores the program component 90 outputted from the CD-ROM drive 27 into the memory area on the RAM 22, which begins at the address "0015 0000H". Thereafter, the control unit 21 discards the program components 91 outputted from the CD-ROM drive 27 after the program component 90, without processing the data, and store the program component 92 outputted from the CD-ROM drive 27 after the program component 91 into the memory area on the RAM 22, which begins at the address "0017 0000H".

Figure 12:
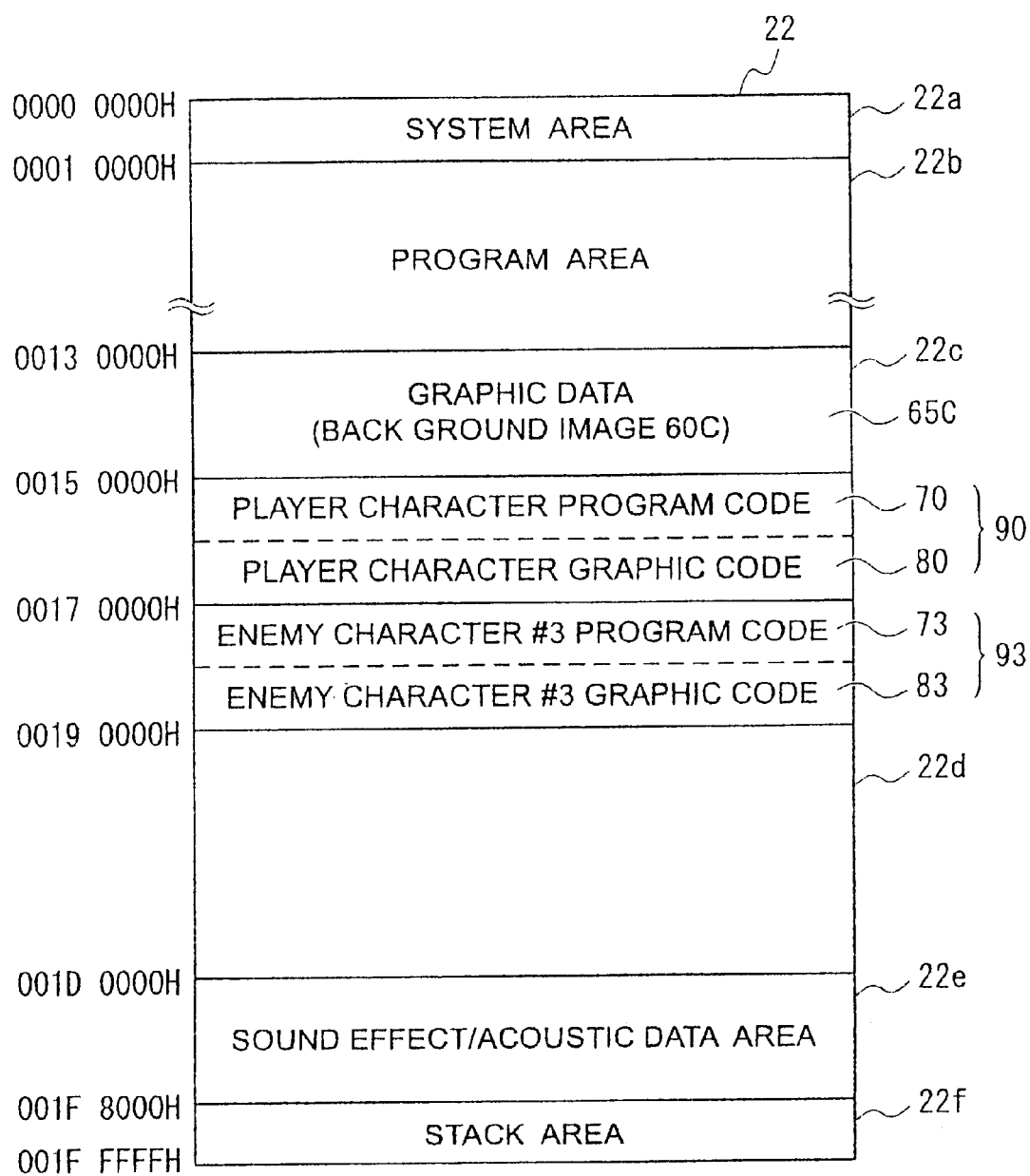
FIG. 12 is an illustrative diagram showing a usage configuration of the RAM at a time of displaying the image shown in FIG. 11.

When updating the contents of the RAM 22 into the one shown in FIG. 12, the control unit 21 instructs the CD-ROM drive 27 to output data stored in a series of contiguous storage locations which begins at the storage location of the program code 90 for the player character, and ends at the storage location of the graphic code 93 for the enemy character #3. More specifically, the control unit 21 instructs the CD-ROM drive 27 to output four program components 90 trough 93 by issuing a instruction including a start address of the program component 90 and the size information indicating the total size of these program components 90 through 93. Then, the control unit 21 stores the program component 90 outputted from the CD-ROM drive 27 into the RAM 22. Thereafter, the control unit 21 discards the program components 91 and 92 outputted from the CD-ROM drive 27 after the program component 90, and stores the program component 93 outputted from the CD-ROM drive 27 after the program component 92 in the RAM 22.

Figure 17:
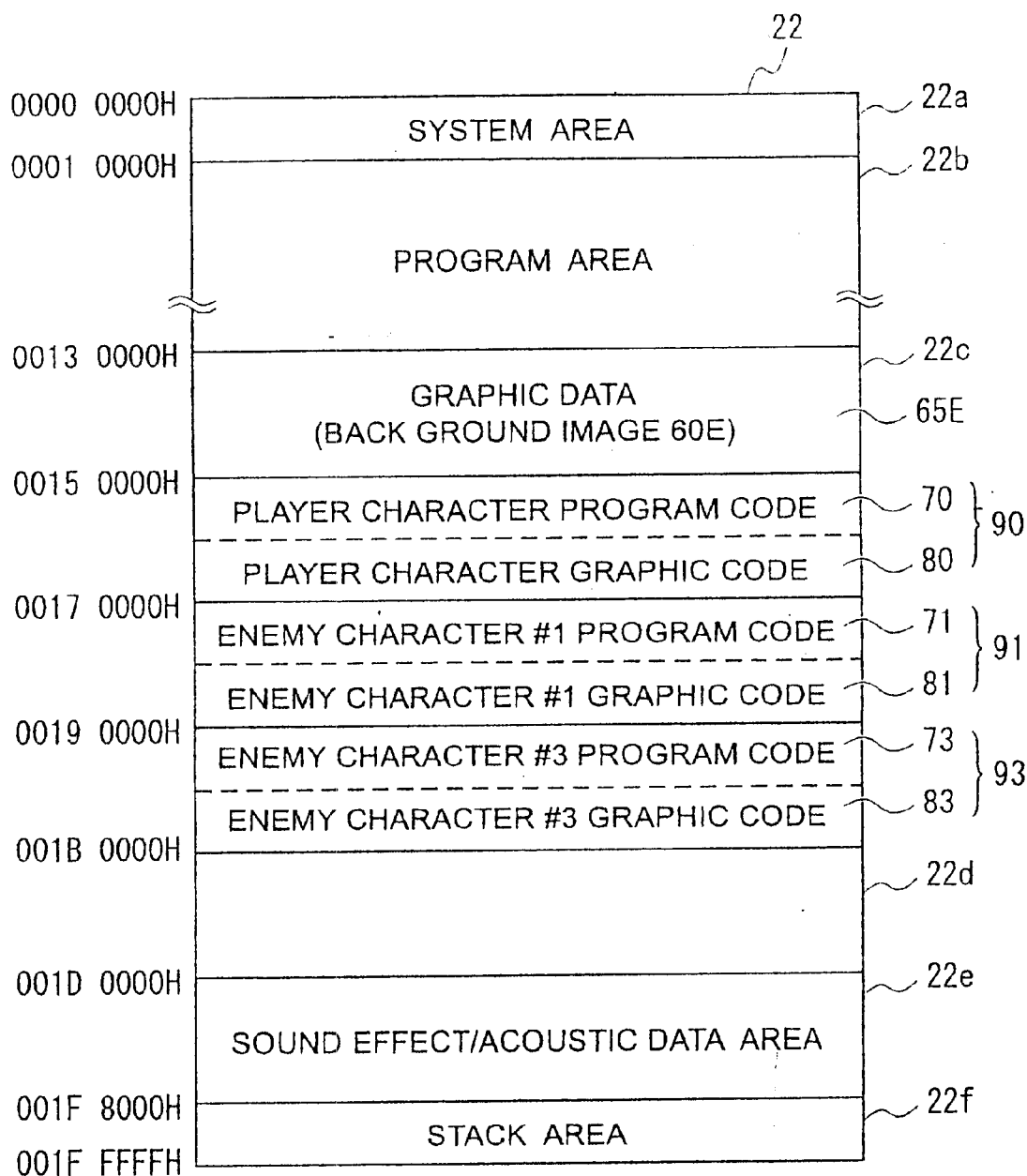
FIG. 17 is an illustrative diagram showing a usage status of the RAM at a time of displaying the image shown in FIG. 16.
Figure 19:
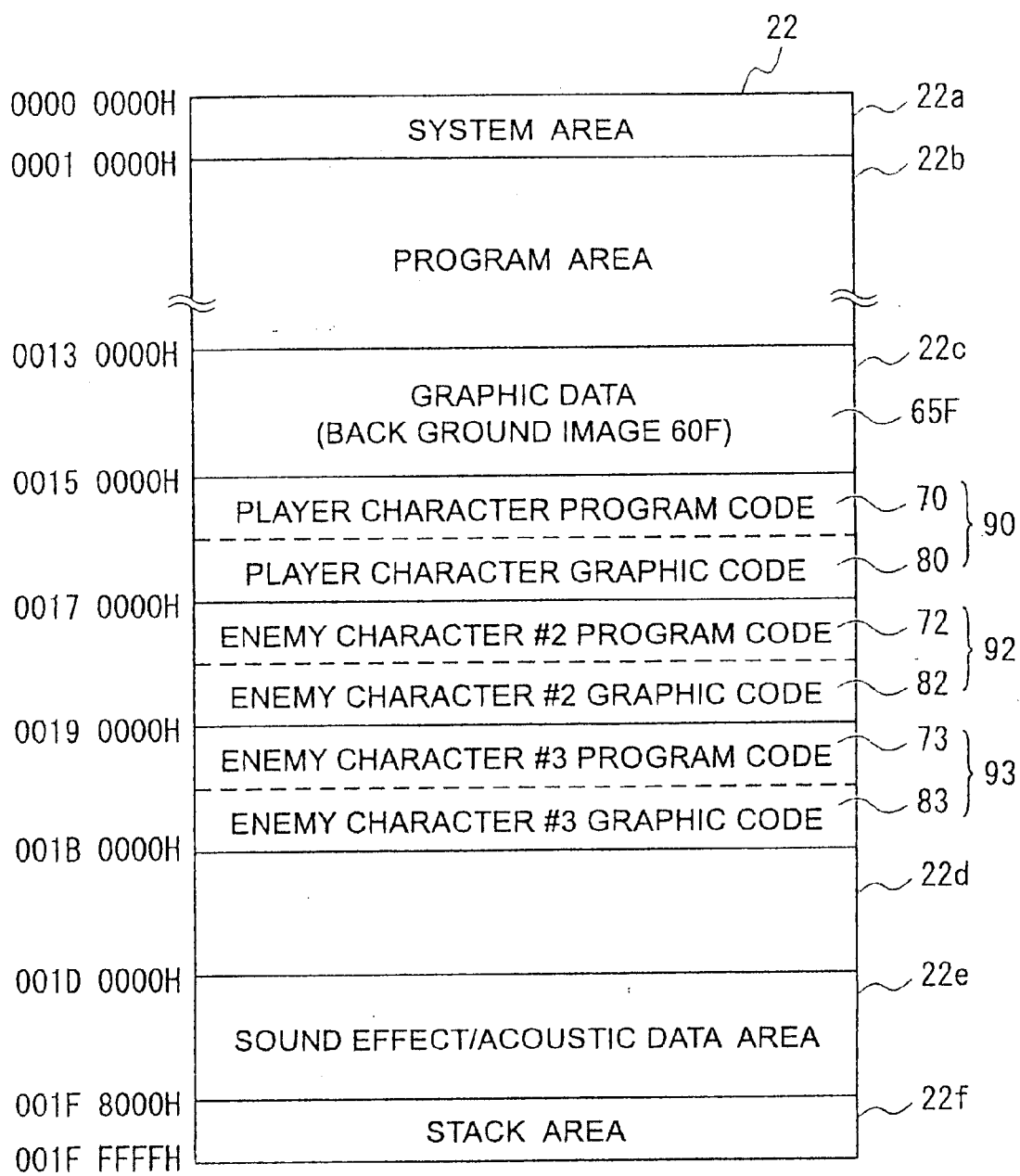
FIG. 19 is an illustrative diagram showing a usage status of the RAM at a time of displaying the image shown in FIG. 18.

When updating the content of the RAM 22 into the one shown in FIG. 17 or FIG. 19, the control unit 21 also executes a similar procedure. More specifically, the control unit 21 instructs the CD-ROM drive 27 to output data which includes one or more unnecessary program components (that is, the program component 92 in FIG. 17 or the program component 91 in FIG. 9) along with plural necessary program components and which is stored at a series of contiguous storage locations on the CD-ROM 10. Then, the control unit 21 stores only the necessary program components included in the output of the CD-ROM drive 27 into the RAM 22.

Figure 15:
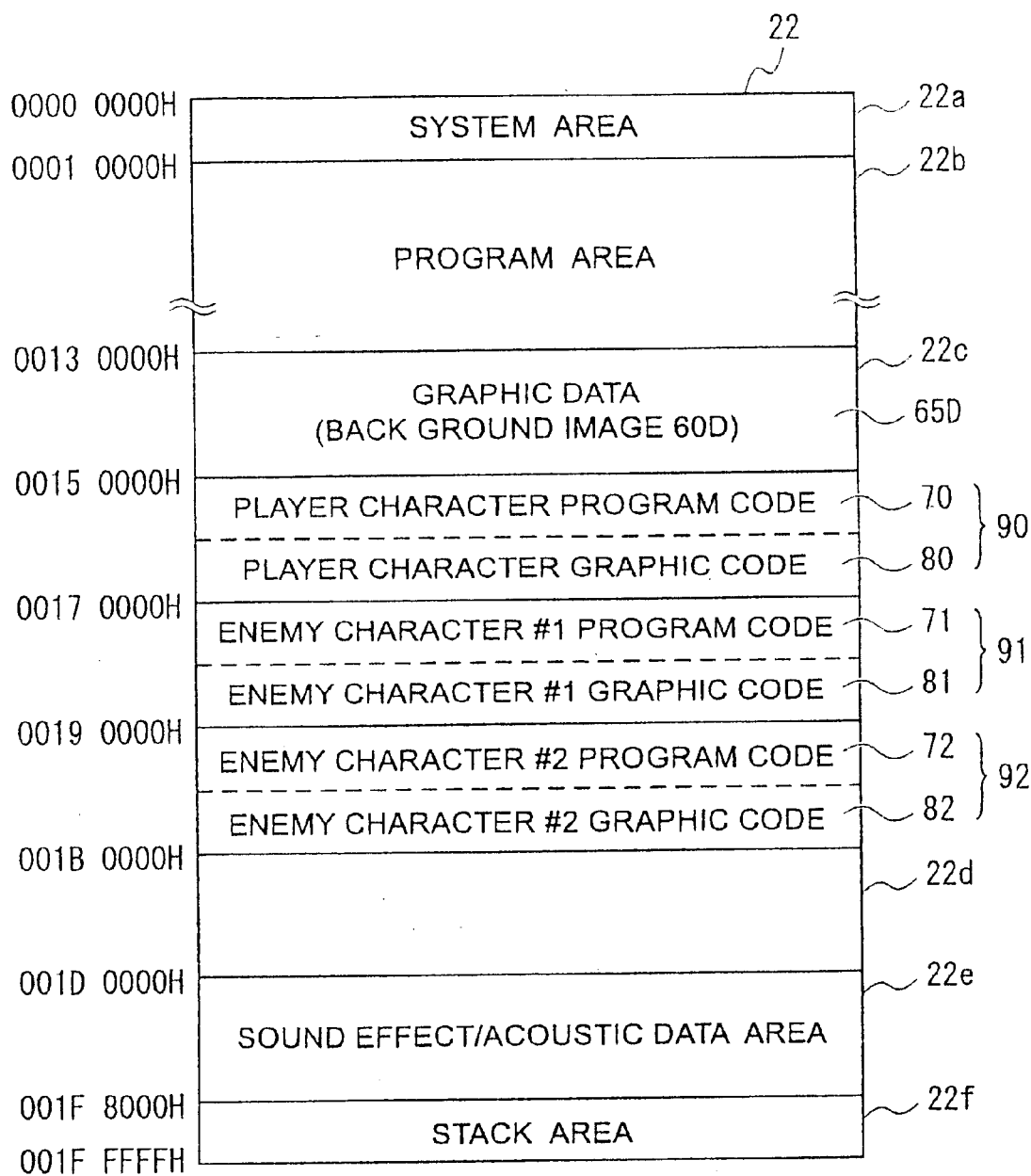
FIG. 15 is an illustrative diagram showing a usage status of the RAM at a time of displaying the image shown in FIG. 14.
Figure 21:
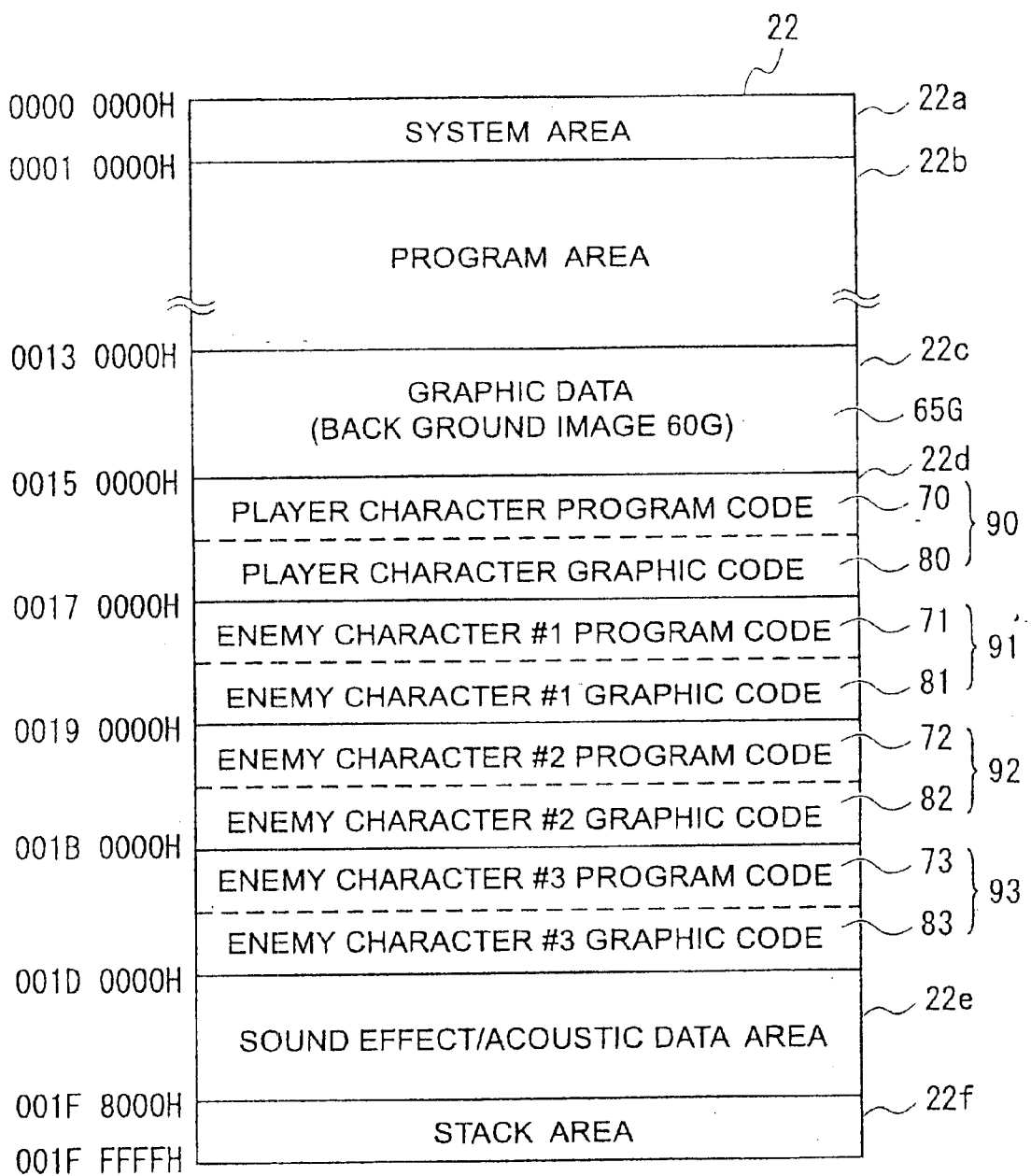
FIG. 21 is an illustrative diagram showing a usage status of the RAM at a time of displaying the image shown in FIG. 20.

When updating the content of the RAM 22 into the one shown in FIG. 5, 15 or 21, namely, when starting a stage of video game which needs some program components record at a series of contiguous storage locations on the CD-ROM 10, the control unit 21 instructs the CD-ROM drive 27 to output data which consists of the necessary program components, and then stores all the program components outputted from the CD-ROM drive 27 into the RAM 22.

As described in detail above, the CD-ROM 10 is configured such that plural program components are recorded in one recording area (that is, contiguous storage locations). And the main program recorded in the CD-ROM 10 includes plural routines each for executing a load process, which consists of a process making the CD-ROM drive 27 outputs several program components with one seek action and a process to store some of program component among the program components outputted from the CD-ROM drive 27 in the RAM 22. Consequently, the information processing apparatus 20 set with this CD-ROM 10 operates without making the CD-ROM drive 27 to perform uselessly, and therefore the information processing apparatus 20 can operate at faster speed than the apparatus set with the CD-ROM 100 shown in FIG. 1.

The CD-ROM 10 of the embodiment may be varied. For example, through the above mentioned CD-ROM 10 is such that the program components are recorded in the storage areas at the outer radius side on the disk, it is desirable to produce the CD-ROM such that the component recording area exists at the inner radius side on the disk when it is designed to be set in the CD-ROM drive in which an access to the data recorded at the inner radius side on the disk can be performed at fast speed.

It may be arranged such that the program codes and the graphic codes, which constitute the program component, are to be written into areas separated each other, rather than into consecutive areas on the RAM 22. In other words, the storage area for use in the program codes and the storage area for use in the graphic codes may be prepared on the RAM 22, separately. Further, the above mentioned technology may be applied to a recording medium other than the CD-ROM (for example, a DVD or a hard disk).

The invention may be embodied in other specific forms without departing from the spirit or essential characteristics thereof. The present embodiments are therefore to be considered in all respects as illustrative and not restrictive, the scope of the invention being indicated by the appended claims rather than by foregoing description and all changes which come within the meaning and range of equivalency of the claims are therefore intended to be embraced therein.

What is claimed is:

1. A computer readable medium which is readable by a computer having a memory through a reading device, comprising:

a program recording area in which a main program to be executed by the computer to perform a game is recorded; and a component recording area in which program components, each of which is used by the computer executing the main program to display a game character, are consecutively recorded, wherein the main program recorded in said program recording area includes a routine for causing the reading device to read out a plurality of program components that are consecutively stored in said component recording area, the plurality of program components comprising necessary program components and unnecessary program components, and for causing the computer to store only the necessary program components, output by the reading device, into the memory.

2. An information processing apparatus comprising:

a recording medium in which program components, each of which is used for displaying a game character, are consecutively recorded;

a reading device for reading the program components from said recording medium;

a memory for temporarily storing some of the program components recorded in said recording medium; and a controller that controls said reading device to read out a plurality of program components that are consecutively stored in said recording medium, the plurality of program components comprising necessary program components and unnecessary program components and that stores only the necessary program components, read by the reading device, into the memory.

3. The information processing apparatus according to claim 2, wherein said recording medium is an optical disc.

* * * * *

UNITED STATES PATENT AND TRADEMARK OFFICE
CERTIFICATE OF CORRECTION

PATENT NO.    : 6,449,687 B1
DATED         : September 10, 2002
INVENTOR(S)   : S. Moriya It is certified that error appears in the above-identified patent and that said Letters Patent is hereby corrected as shown below:

<u>Title page,</u>
Item [54], Title, delete the title and insert the following:
-- GAME COMPUTER READABLE MEDIUM AND APPARATUS FOR READING CONSECUTIVE GAME DATA --.

Signed and Sealed this

Third Day of June, 2003

JAMES E. ROGAN
*Director of the United States Patent and Trademark Office*